(12) United States Patent
Ding et al.

(10) Patent No.: US 11,760,306 B2
(45) Date of Patent: Sep. 19, 2023

(54) AUTOMOBILE REMOTE CONTROL KEY AND VEHICLE CONTROL METHOD

(71) Applicant: NIO TECHNOLOGY (ANHUI) CO., LTD, Hefei (CN)

(72) Inventors: Qianchuang Ding, Hefei (CN); Mingzhi Tong, Hefei (CN); Linsen Mu, Hefei (CN); Rui Zhang, Hefei (CN)

(73) Assignee: NIO TECHNOLOGY (ANHUI) CO., LTD., Hefei (CN)

( * ) Notice: Subject to any disclaimer, the term of this patent is extended or adjusted under 35 U.S.C. 154(b) by 0 days.

(21) Appl. No.: 17/588,506

(22) Filed: Jan. 31, 2022

(65) Prior Publication Data

US 2022/0242368 A1    Aug. 4, 2022

(30) Foreign Application Priority Data

Feb. 3, 2021   (CN) .......................... 202110148481.0

(51) Int. Cl.
| | |
|---|---|
| *B60R 25/24* | (2013.01) |
| *G07C 9/00* | (2020.01) |
| *H04W 4/02* | (2018.01) |
| *H04W 4/40* | (2018.01) |
| *B60R 25/01* | (2013.01) |
| *B60R 25/20* | (2013.01) |

(52) U.S. Cl.
CPC .............. *B60R 25/24* (2013.01); *B60R 25/01* (2013.01); *B60R 25/2045* (2013.01); *G07C 9/00309* (2013.01); *H04W 4/027* (2013.01); *H04W 4/40* (2018.02); *G07C 2009/00769* (2013.01); *G07C 2009/00984* (2013.01)

(58) Field of Classification Search
CPC ..... B60R 25/24; B60R 25/01; B60R 25/2045; H04W 4/40; H04W 4/027; G07C 9/00309; G07C 2009/00769; G07C 2009/00984
See application file for complete search history.

(56) References Cited

U.S. PATENT DOCUMENTS

| | | | | |
|---|---|---|---|---|
| 2017/0160786 | A1* | 6/2017 | Ji | ........................ G07C 9/00309 |
| 2017/0309098 | A1* | 10/2017 | Watters | ................... H04W 4/80 |
| 2017/0309994 | A1* | 10/2017 | Nikitin | ................... H01Q 1/245 |
| 2019/0035192 | A1* | 1/2019 | Hanson | .............. G07C 9/00309 |
| 2020/0219338 | A1* | 7/2020 | Chen | ..................... B60R 25/002 |

OTHER PUBLICATIONS

Extended Search Report for European Patent Application No. 22150619.9, dated Jul. 8, 2022, 10 pages.

* cited by examiner

*Primary Examiner* — Thomas D Alunkal
(74) *Attorney, Agent, or Firm* — Sheridan Ross P.C.

(57) ABSTRACT

The invention relates to automotive electronic technologies, and in particular, to an automobile remote control key, a vehicle control method using an automobile remote control key, and a computer-readable storage medium for implementing the method. According to an aspect of the invention, a vehicle remote control key includes: a sensor configured to obtain movement data of the automobile remote control key; a control unit coupled to the sensor and configured to recognize a motion pattern of a user based on the movement data; and a wireless communication module coupled to the control unit and configured to send a message about the motion pattern to a vehicle control system, so that the vehicle control system generates a corresponding control command.

15 Claims, 6 Drawing Sheets

AUTOMOBILE REMOTE CONTROL KEY AND VEHICLE CONTROL METHOD

CROSS-REFERENCE TO RELATED APPLICATION

This application claims the benefit of China Patent Application No. 202110148481.0 filed Feb. 3, 2021, the entire contents of which are incorporated herein by reference in its entirety.

TECHNICAL FIELD

The invention relates to automotive electronic technologies, and in particular, to an automobile remote control key, a vehicle control method using an automobile remote control key, and a computer-readable storage medium for implementing the method.

BACKGROUND ART

An automobile remote control key controls locking and unlocking of a car door in a wireless manner. As information technologies develop, "intelligentization" has become an inevitable trend of upgrade of vehicle technologies. Accordingly, a remote control function of an automobile remote control key is to be extended, and extended functions include opening and closing of a charging port cover of an electric vehicle, automatic car locating, a function of a vehicle-mounted system (for example, seat heating, and regulation of temperature inside a car), etc. However, a relatively small surface area of a key imposes great restrictions on an increase in the number of function buttons. Although this difficulty can be alleviated by means of combining the function buttons, a further problem of inconvenience is caused. For example, a user needs to memorize various mapping relationships between combined buttons and functions, and in a dark environment and when the user carries something in the hands, it is not easy to press a button.

It can be seen from the above that there is a need to provide an automobile remote control key and a vehicle control method, which can resolve the above problems.

SUMMARY OF THE INVENTION

An objective of the invention is to provide an automobile remote control key, a vehicle control method using an automobile remote control key, and a computer-readable storage medium for implementing the method, which can resolve problems of difficulty in extending a function of the automobile remote control key, inconvenience in operating on buttons, etc.

According to an aspect of the invention, a vehicle remote control key includes:
  a sensor configured to obtain movement data of the automobile remote control key;
  a control unit coupled to the sensor and configured to recognize a motion pattern of a user based on the movement data; and
  a wireless communication module coupled to the control unit and configured to send a message about the motion pattern to a vehicle control system, so that the vehicle control system generates a corresponding control command.

Preferably, in the automobile remote control key, the motion pattern is recognized by:
  determining a movement trajectory or a spatial attitude change of the automobile remote control key based on the movement data;
  determining a trajectory category to which the movement trajectory belongs or an attitude change category to which the spatial attitude change belongs; and
  determining a corresponding motion pattern based on the trajectory category or the attitude category.

According to an aspect of the invention, a vehicle remote control key includes:
  a wireless communication unit including an antenna array; and
  a control unit coupled to the wireless communication unit and configured to: recognize a motion pattern of a user based on a signal received by the antenna array from a signal source, and instruct the wireless communication unit to send a message about the motion pattern to a vehicle control system.

Preferably, in the automobile remote control key, the signal source is a vehicle-mounted wireless communication module, and the control unit is configured to recognize the motion pattern by:
  determining relative positions between the automobile remote control key and the signal source at a plurality of moments based on the signal received by the antenna array, to obtain a movement trajectory of the automobile remote control key;
  determining a trajectory category to which the movement trajectory belongs; and
  determining a corresponding motion pattern based on the trajectory category.

According to a further aspect of the invention, a vehicle control system includes:
  a vehicle-mounted wireless communication unit configured to receive a message about a motion pattern from the wireless communication unit of the automobile remote control key; and
  a control unit coupled to the vehicle-mounted wireless communication unit and configured to instruct, based on the motion pattern, an execution component to execute a corresponding operation.

Preferably, in the vehicle control system, the control unit includes a memory, which is configured to store a mapping relationship between the motion pattern and a control command, and allow an operation of modifying the stored mapping relationship to be executed.

According to another aspect of the invention, a vehicle control method using an automobile remote control key includes the following steps:
  obtaining movement data of the automobile remote control key by using a sensor provided in the automobile remote control key;
  recognizing a motion pattern of a user based on the movement data; and
  sending a message about the motion pattern to a vehicle control system, so that the vehicle control system generates a corresponding control command.

Preferably, the method further includes the following step:
  generating the corresponding control command by the vehicle control system based on the motion pattern.

According to another aspect of the invention, a vehicle control method using an automobile remote control key includes the following steps:
  receiving a signal from a signal source by using an antenna array provided in the automobile remote control key;

recognizing a motion pattern of a user based on the signal; and sending a message about the motion pattern to a vehicle control system via the antenna array.

According to still another aspect of the invention, a computer-readable storage medium having a computer program stored thereon is provided, where the program implements the method described above when executed by a processor.

In one or more embodiments of the invention, a motion pattern of a user is recognized based on a movement trajectory or a spatial attitude change of an automobile remote control key, and on this basis, a control command that the user wants to convey is determined. The user does not need an operation on a button to convey an intention of control, so that operations are simplified and the number of control functions of the vehicle remote control key is extended. In addition, in one or more embodiments of the invention, a mapping relationship between the motion pattern and the control function or the control command is self-defined by the user and is modifiable. This makes an operation more adaptable to usage habits of each user. Further, in one or more embodiments of the invention, the mapping relationship is stored in the vehicle remote control key, which is favorable for a case in which a plurality of users use the same vehicle.

BRIEF DESCRIPTION OF THE DRAWINGS

The above-mentioned and/or other aspects and advantages of the invention will become clearer and more comprehensible from the following description of various aspects in conjunction with the accompanying drawings, in which the same or similar units are denoted by the same reference numerals. In the drawings.

DETAILED DESCRIPTION OF EMBODIMENTS

Figure 1:
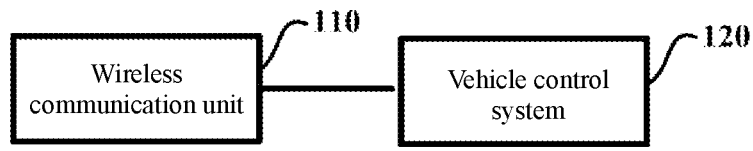
FIG. 1 is a schematic block diagram of a vehicle control system according to an embodiment of the invention.

The invention is described below more comprehensively with reference to the accompanying drawings in which schematic embodiments of the invention are shown. However, the invention may be implemented in different forms, and should not be construed as being limited to the embodiments provided herein. The embodiments provided above are intended to make the disclosure of this specification comprehensive and complete, so as to more comprehensively convey the scope of protection of the invention to those skilled in the art.

In this specification, the terms such as "include" and "comprise" indicate that in addition to the units and steps that are directly and clearly described in the specification and claims, other units and steps that are not directly or clearly described are not excluded in the technical solutions of the invention.

The terms such as "first" and "second" are not used to indicate sequences of units in terms of time, space, size, etc., and are only used to distinguish between the units.

According to an aspect of the invention, a mapping relationship may be set between a motion pattern of a user and a control function or a control command, and a motion pattern may be recognized based on movement data of an automobile remote control key, so that remote control of a vehicle function is implemented. The motion pattern described herein refers to various types of gestures of a user. When the user holds a key to complete a motion, a movement trajectory or a spatial attitude change of the key can describe characteristics of various types of gestures, and therefore, a corresponding motion pattern can be recognized based on movement data. Examples of the motion pattern include, but are not limited to, single left-right waving, repeated left-right waving, single up-down waving, repeated up-down waving, counter-clockwise circling, clockwise circling, wrist turning, etc.

According to another aspect of the invention, movement data of an automobile remote control key may be obtained by using a sensor (such as a MEMS accelerometer and a MEMS gyroscope). Optionally, the movement trajectory may be determined based on an acceleration of the automobile remote control key at each moment, or the spatial attitude change may be determined based on an angular velocity of the automobile remote control key at each moment. Then, a trajectory category (such as a single horizontal translation and a reciprocating horizontal translation, a single vertical translation and a reciprocating vertical translation, and a trajectory of a substantially closed curve) is determined based on the movement trajectory, or an attitude change category (rotation about one or more axes, etc.) is determined based on the spatial attitude change.

According to another aspect of the invention, a relative position between an automobile remote control key and a signal source is determined based on a signal received by an antenna array from the signal source, to obtain a movement trajectory of the automobile remote control key and thereby determine a corresponding trajectory category.

According to another aspect of the invention, recognition of a motion pattern is completed at an automobile remote control key, and then a message about the motion pattern is sent to a vehicle control system via a wireless communication unit (for example, including, but not limited to, a Bluetooth communication circuit, an ultra-wideband communication circuit, and a low-frequency communication circuit). Correspondingly, the vehicle control system maps the motion pattern to a corresponding control command (for example, turning on and turning off of a car light, locking and unlocking of a car door, opening and closing of a charging port cover, automatic car locating, seat and steering wheel heating, regulation of temperature inside a car, and starting of an entertainment system). Optionally, a mapping relationship between the motion pattern and the control command is stored in a memory of the vehicle control system, and is modifiable. Therefore, a user can flexibly and conveniently define the mapping relationship.

According to another aspect of the invention, an automobile remote control key maps a motion pattern to a corresponding control command, and sends a message about the control command to a vehicle control system via a wireless communication unit. Optionally, a button provided on a surface of the automobile remote control key may be used as a man-machine interface. Through an operation on the button, a mapping relationship between the motion pattern and the control command is set and stored in a memory of the automobile remote control key. The mapping relationship stored in the memory may also be modified through the operation on the button. Optionally, the mapping relationship between the motion pattern and the control command may also be set or modified by using an external apparatus (for example, the vehicle control system). Completing an operation of mapping the motion pattern to the control command at the automobile remote control key can provide different mapping relationships for the same vehicle, which is favorable for a multi-user use case. For example, for the same control command, motion patterns defined by users A and B may be different, but vehicle remote control keys of the users each may map different motion patterns to the same control command based on a user-defined mapping relationship.

FIG. 1 is a schematic block diagram of a vehicle control system according to an embodiment of the invention.

The vehicle control system 10 shown in FIG. 1 includes a vehicle-mounted wireless communication unit 110 and a control unit 120.

The vehicle-mounted wireless communication unit 110 is communicatively coupled to a wireless communication unit of an automobile remote control key. The vehicle-mounted wireless communication unit may, for example, receive a message about a motion pattern or a control command from the wireless communication unit, or send an instruction of modifying a mapping relationship between the motion pattern and the control command to the wireless communication unit.

The control unit 120 is coupled to the vehicle-mounted wireless communication unit 110 (for example, through a gateway). The control unit maps the motion pattern indicated by the message received by the vehicle-mounted wireless communication unit 110 to the control command and instructs an execution component to execute a corresponding operation, or instructs an execution component to execute a corresponding operation based on the control command indicated by the message received by the vehicle-mounted wireless communication unit 110. Optionally, the control unit 120 may also send the instruction of modifying the mapping relationship between the motion pattern and the control command to the vehicle remote control key via the vehicle-mounted wireless communication unit 110.

Figure 2:
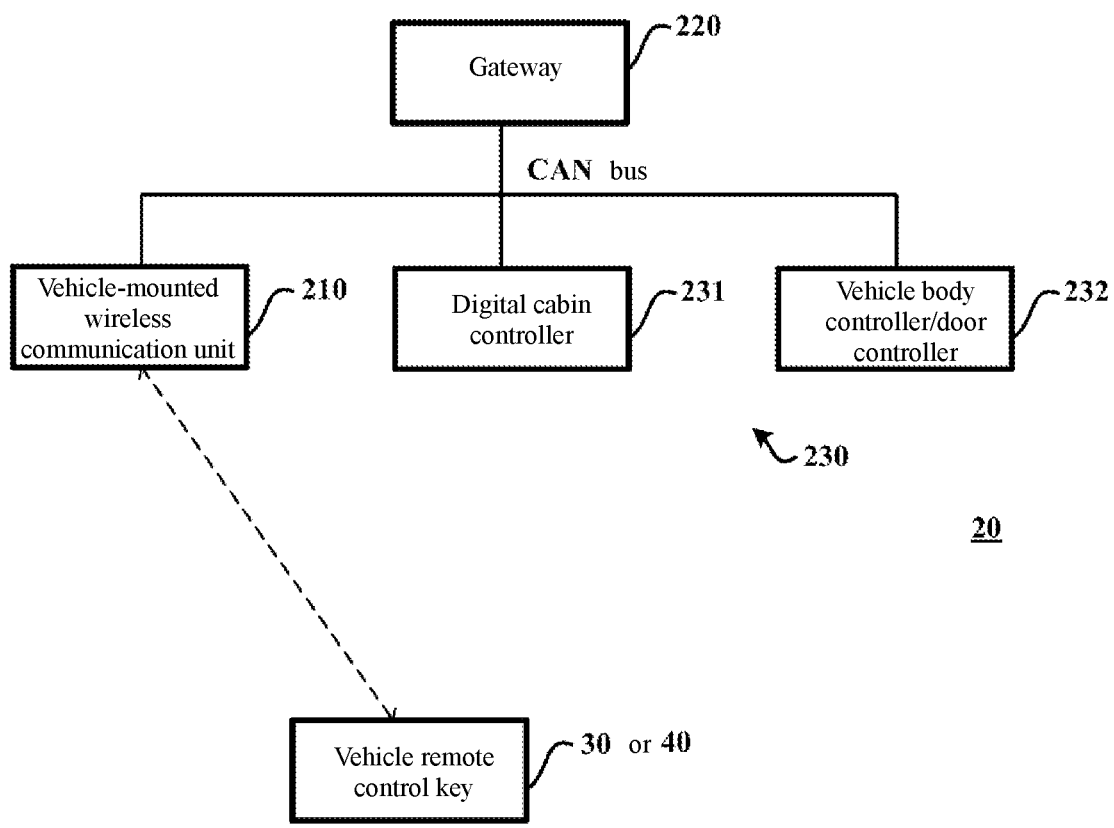
FIG. 2 is a schematic diagram of a specific implementation solution of the embodiment shown in FIG. 1.

FIG. 2 is a schematic diagram of a specific implementation solution of the embodiment shown in FIG. 1.

In FIG. 2, a vehicle control system 20 includes a vehicle-mounted wireless communication unit 210, a gateway 220 (such as a CAN bus gateway), and a control unit 230, which are accessed to a CAN bus.

In this embodiment, the vehicle-mounted wireless communication unit 210 performs a verification operation on a wireless signal received from a vehicle remote control key 30 or 40, and converts, after the verification is passed, a message borne by the wireless signal (for example, a message about the motion pattern or a message about the control command) into a CAN message and then sends the message to the gateway 220.

Exemplarily, the control unit 230 includes a plurality of controllers (for example, a digital cabin controller 231 and a vehicle body controller/door controller 232), and the controllers communicate with each other and with the vehicle-mounted wireless communication unit 210 via the gateway 220. For example, the gateway 220 may forward the CAN message of the vehicle-mounted wireless communication unit 210 to the digital cabin controller 231 and the vehicle body controller/door controller 232, to perform a corresponding operation (for example, opening and closing of a charging port cover, locking or unlocking of a car door, starting of an entertainment system, etc.). In addition, the gateway 220 may send setting information (for example, the mapping relationship between the motion pattern and the control command) of the digital cabin controller 231 to the vehicle body controller/door controller 232.

In this embodiment, the digital cabin controller 231 is, for example, configured to enable a function of self-defining the motion pattern of the vehicle remote control key, such that a user may self-define the mapping relationship between the motion pattern and the control command. For example, the digital cabin controller 231 may include a memory 2311 (such as an EEPROM and a flash memory), which may be used to store the above mapping relationship. After a user creates or modifies the mapping relationship between the motion pattern and the control command, the digital cabin controller 231 stores a created or modified mapping relationship in the memory 2311, and sends, via the gateway 220, the mapping relationship to a controller associated with the control command (for example, if the control command related to the mapping relationship is locking and unlocking of a car door, the mapping relationship is sent to the vehicle body controller/door controller 232).

Figure 3:
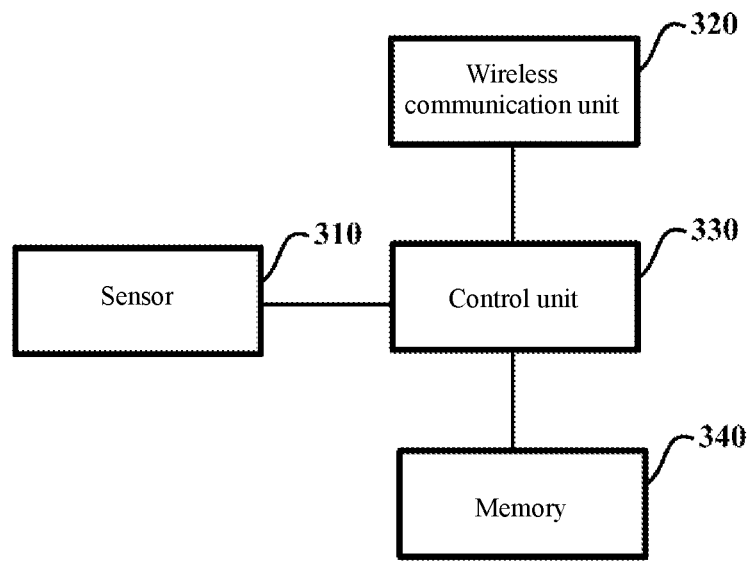
FIG. 3 is a schematic block diagram of an automobile remote control key according to another embodiment of the invention.

FIG. 3 is a schematic block diagram of an automobile remote control key according to another embodiment of the invention.

The automobile remote control key 30 shown in FIG. 3 includes a sensor 310, a wireless communication unit 320, a control unit 330, and a memory 340.

The sensor 310 shown in FIG. 3 is a MEMS sensor, for example, a MEMS accelerometer, a MEMS gyroscope, etc. Movement data of the automobile remote control key that is obtained by the sensor 310 is output to the control unit 330, and the control unit recognizes a motion pattern of a user based on the movement data. For example, the control unit 330 determines a movement trajectory or a spatial attitude change of the automobile remote control key based on the movement data, determines a trajectory category to which the movement trajectory belongs or an attitude change category to which the spatial attitude change belongs, and then determines a corresponding motion pattern based on the trajectory category or the attitude category.

The control unit 330 then generates a message about the recognized motion pattern and sends the message to a vehicle control system via the wireless communication module 320. Correspondingly, the vehicle control system maps the motion pattern to a corresponding control command, and instructs an execution component to execute a corresponding operation.

Optionally, in addition to recognizing a motion pattern of a user based on the movement data, the control unit 330 further maps the motion pattern to a corresponding control command, and sends a message about the control command to the vehicle control system via the wireless communication module 320. In other words, the mapping of the motion pattern to the control command is also completed at the vehicle remote control key.

In this embodiment, the wireless communication unit 320 may be a communication circuit for implementing one or more communication protocols, which, for example, includes an antenna and a radio frequency processing unit. Examples of the communication circuit include, but are not limited to, a Bluetooth communication circuit, an ultra-wideband communication circuit, and a low-frequency communication circuit.

The memory 340 may store a computer program executed by the control unit 330, and the execution of the computer program enables a motion pattern of a user to be recognized based on the movement data. In addition, when the mapping of the motion pattern to a control command is completed locally, the memory 340 may also store a mapping relationship between the motion pattern and the control command. Optionally, the memory 340 is a read-write memory (such as a flash memory), to allow modifications to the mapping relationship.

Figure 4:
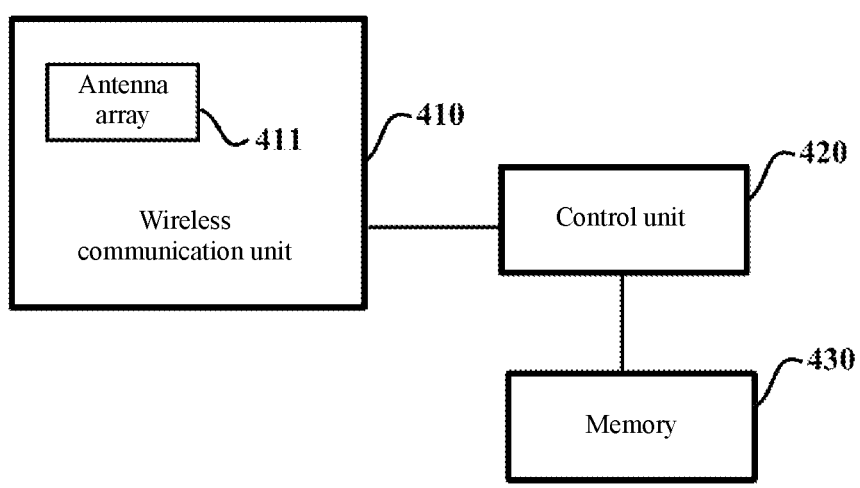
FIG. 4 is a schematic block diagram of an automobile remote control key according to another embodiment of the invention.

FIG. 4 is a schematic block diagram of an automobile remote control key according to another embodiment of the invention.

The automobile remote control key 40 shown in FIG. 4 includes a wireless communication unit 410, a control unit 420, and a memory 430.

The wireless communication unit 410 shown in FIG. 4 includes an antenna array 411. The antenna array 411 is configured to receive a signal from a signal source (such as a vehicle-mounted wireless communication circuit), and transmit a signal to the vehicle-mounted wireless communication circuit. The control unit 420 is configured to recognize a corresponding motion pattern of the vehicle remote control key based on the received signal. For example, the control unit 420 determines positions of the automobile remote control key relative to the signal source at a plurality of moments based on differences in signals (for example, a receiving time difference, a received signal strength difference, etc.) received by different antennas in the antenna array, to obtain a movement trajectory of the automobile remote control key, determines a trajectory category to which the movement trajectory belongs, and then determines the corresponding motion pattern based on the trajectory category. After the motion pattern is determined, the control unit 420 generates a message about the recognized motion pattern and sends the message to a vehicle control system via the wireless communication module 410. Correspondingly, the vehicle control system maps the motion pattern to a corresponding control command, and instructs an execution component to execute a corresponding operation.

Optionally, the mapping of the motion pattern to the control command may also be completed at the vehicle remote control key. In this case, the control unit 430 maps the motion pattern to a corresponding control command, and sends a message about the control command to the vehicle control system via the wireless communication module 410.

In this embodiment, the wireless communication unit 410 may be a communication circuit for implementing one or more communication protocols. Examples of the communication circuit include, but are not limited to, a Bluetooth communication circuit, an ultra-wideband communication circuit, and a low-frequency communication circuit.

The memory 430 may store a computer program executed by the control unit 430, and the execution of the computer program enables a motion pattern of a user to be recognized based on a signal received by the antenna array. Similarly, the memory 430 is a read-write memory (such as a flash memory), which can store the mapping relationship between the motion pattern and the control command and allow modifications to the mapping relationship.

Figure 5:
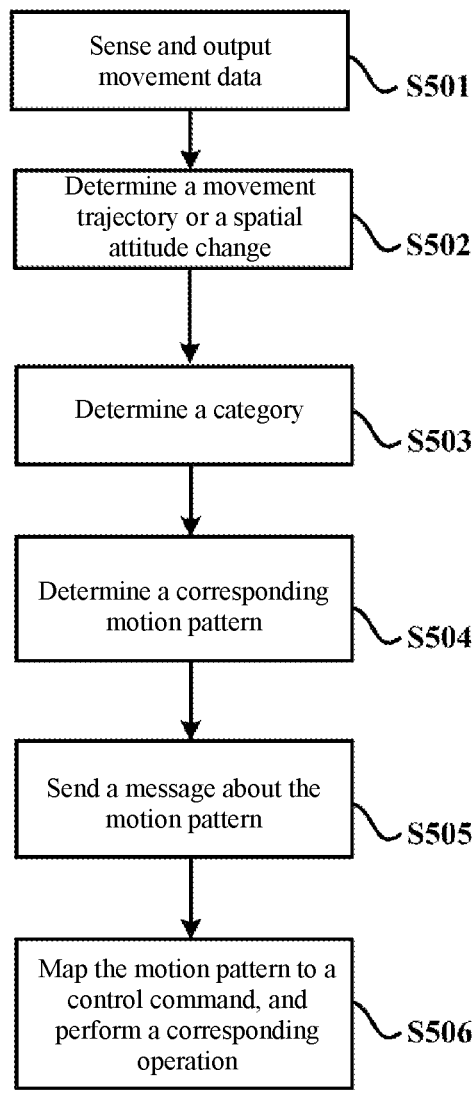
FIG. 5 illustrates a vehicle control method using an automobile remote control key according to another embodiment of the invention.

FIG. 5 illustrates a vehicle control method using an automobile remote control key according to another embodiment of the invention. Exemplarily, the method in this embodiment is implemented by using the automobile remote control key described in FIG. 3.

As shown in FIG. 5, in step S501, the sensor 310 of the automobile remote control key 30 senses a movement of the automobile remote control key, and outputs movement data to the control unit 330. As described above, the movement data may be, for example, an acceleration or an angular velocity of the key at each moment.

The process then proceeds to step S502, in which the control unit 330 determines a movement trajectory or a spatial attitude change of the automobile remote control key based on the movement data.

Then, in step S503, the control unit 330 determines a trajectory category to which the movement trajectory belongs or an attitude change category to which the spatial attitude change belongs.

After step S503, the process proceeds to step S504. In this step, the control unit 330 determines a corresponding motion pattern based on the trajectory category or the attitude category.

The process then proceeds to step S505, in which the control unit 330 generates a message about the motion pattern and sends the message to a vehicle control system via the wireless communication unit 320.

Then, in step S506, the vehicle control system maps, based on a mapping correlation between the motion pattern and a control command, a motion pattern indicated in the message received by the wireless communication unit 110 to a corresponding control command, and instructs an execution component to execute a corresponding operation.

Figure 6:
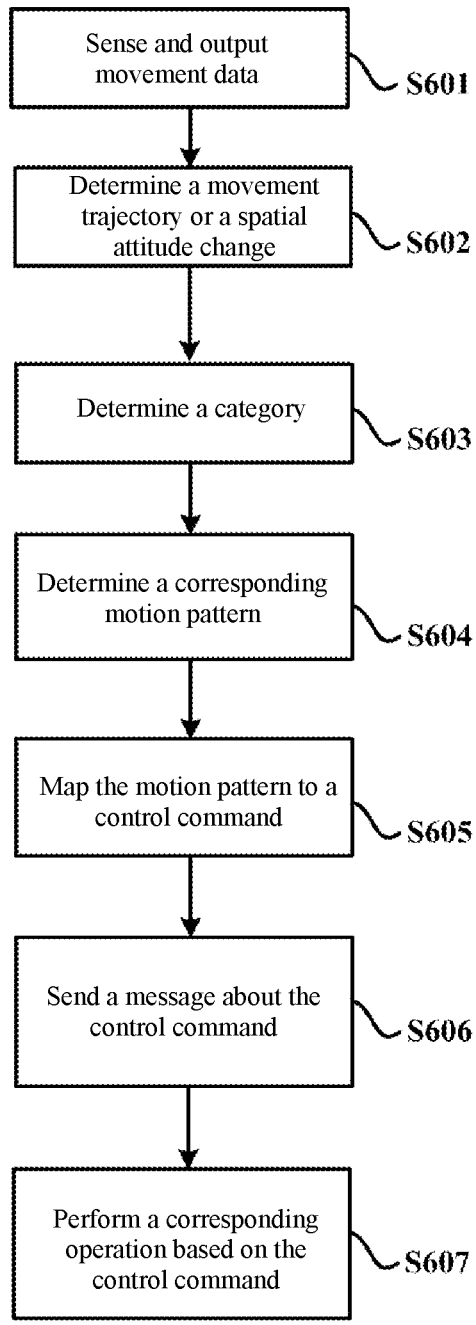
FIG. 6 illustrates a vehicle control method using an automobile remote control key according to another embodiment of the invention.

FIG. 6 illustrates a vehicle control method using an automobile remote control key according to another embodiment of the invention. Exemplarily, the method in this embodiment is implemented by using the automobile remote control key described in FIG. 3.

As shown in FIG. 6, in step S601, the sensor 310 of the automobile remote control key 30 senses a movement of the automobile remote control key, and outputs movement data (such as an acceleration or an angular velocity of the key at each moment) to the control unit 330.

The process then proceeds to step S602, in which the control unit 330 determines a movement trajectory or a spatial attitude change of the automobile remote control key based on the movement data.

Then, in step S603, the control unit 330 determines a trajectory category to which the movement trajectory belongs or an attitude change category to which the spatial attitude change belongs.

After step S603, the process proceeds to step S604. In this step, the control unit 330 determines a corresponding motion pattern based on the trajectory category or the attitude category.

The process then proceeds to step S605, in which the control unit 330 maps, based on the mapping relationship between the motion pattern and the control command in the memory 340, the determined motion pattern to a corresponding control command.

After step S605, the process proceeds to step S606. In this step, the control unit 330 generates a message about the control command and sends the message to a vehicle control system.

Then, in step S607, a control unit 120 of the vehicle control system instructs, based on the control command in the message, an execution component to execute a corresponding operation.

Figure 7:
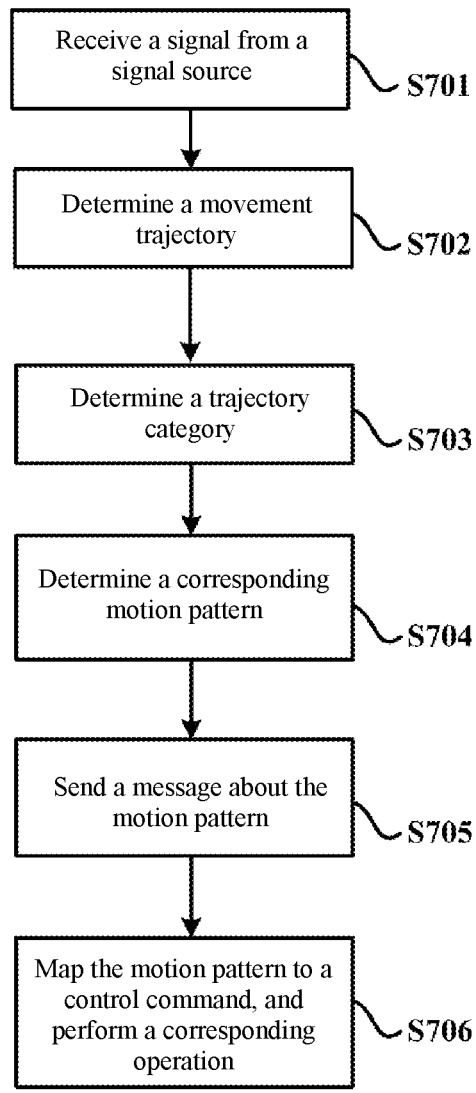
FIG. 7 illustrates a vehicle control method using an automobile remote control key according to another embodiment of the invention.

FIG. 7 illustrates a vehicle control method using an automobile remote control key according to another embodiment of the invention. Exemplarily, the method in this embodiment is implemented by using the automobile remote control key described in FIG. 4.

As shown in FIG. 7, in step S701, the antenna array 411 in the wireless communication unit 410 of the automobile remote control key 40 receives a signal from a signal source (such as a vehicle-mounted wireless communication circuit).

The process then proceeds to step S702, in which the control unit 420 determines positions of the automobile remote control key relative to the signal source at a plurality of moments based on differences in signals (for example, a receiving time difference, a received signal strength difference, etc.) received by different antennas in the antenna array, to obtain a movement trajectory of the key.

Then, in step S703, the control unit 420 determines a trajectory category to which the movement trajectory belongs.

After step S703, the process proceeds to step S704. In this step, the control unit 420 determines a corresponding motion pattern based on the trajectory category.

The process then proceeds to step S705, in which the control unit 420 generates a message about the motion pattern and sends the message to a vehicle control system via the wireless communication unit 410.

Then, in step S706, the control unit 120 of the vehicle control system maps, based on a mapping correlation between the motion pattern and a control command, a motion pattern indicated in the message received by the wireless communication unit 110 to a corresponding control command, and instructs an execution component to execute a corresponding operation.

Figure 8:
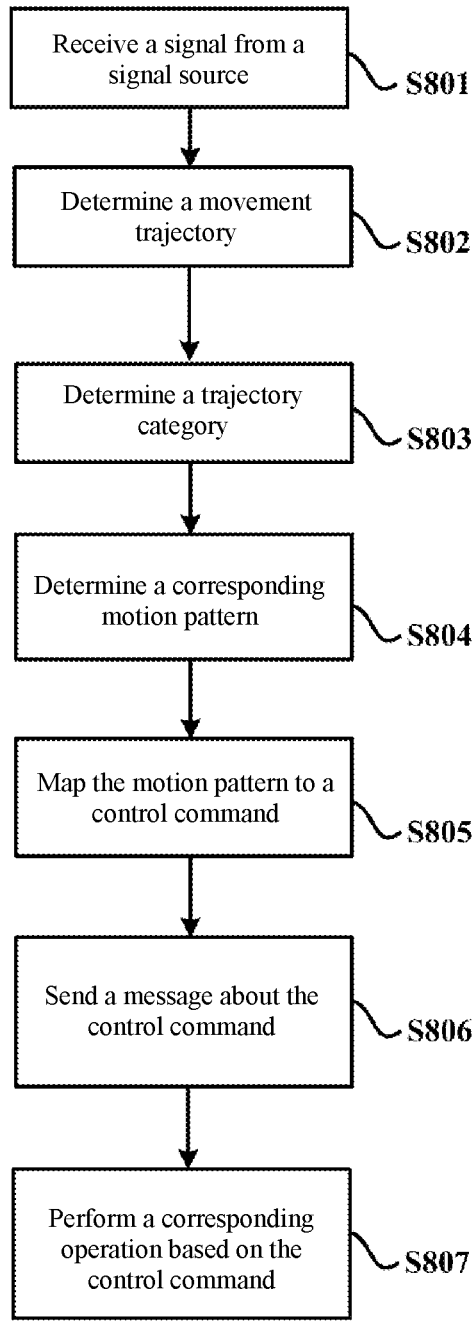
FIG. 8 illustrates a vehicle control method using an automobile remote control key according to another embodiment of the invention.

FIG. 8 illustrates a vehicle control method using an automobile remote control key according to another embodiment of the invention. Exemplarily, the method in this embodiment is implemented by using the automobile remote control key described in FIG. 4.

As shown in FIG. 8, in step S801, the antenna array 411 in the wireless communication unit 410 of the automobile remote control key 40 receives a signal from a signal source (such as a vehicle-mounted wireless communication circuit).

The process then proceeds to step S802, in which the control unit 420 determines a movement trajectory of the automobile remote control key based on the movement data.

Then, in step S803, the control unit 420 determines a trajectory category to which the movement trajectory belongs.

After step S803, the process proceeds to step S804. In this step, the control unit 420 determines a corresponding motion pattern based on the trajectory category.

The process then proceeds to step S805, in which the control unit 420 maps, based on the mapping relationship between the motion pattern and the control command in the memory 430, the determined motion pattern to a corresponding control command.

After step S805, the process proceeds to step S806. In this step, the control unit 420 generates a message about the control command and sends the message to a vehicle control system.

Then, in step S807, a control unit 120 of the vehicle control system instructs, based on the control command in the message, an execution component to execute a corresponding operation.

According to another aspect of the invention, further provided is a computer-readable storage medium having a computer program stored thereon, where the program can implement, when executed by a processor, the steps included in the method as described above by means of FIG. 5 to FIG. 8.

The embodiments and examples proposed herein are provided to describe as adequately as possible embodiments according to the technology and specific applications thereof and thus enable those skilled in the art to implement and use the invention. However, those skilled in the art will know that the above descriptions and examples are provided only for description and illustration. The proposed description is not intended to cover all aspects of the invention or limit the invention to the disclosed precise forms.

In view of the description above, the scope of the disclosure is defined by the following claims.

What is claimed is:

1. An automobile remote control key, comprising:
   a sensor configured to obtain movement data of the automobile remote control key;
   a control unit coupled to the sensor and configured to recognize a motion pattern of a user based on the movement data and map the motion pattern to a corresponding control command; and
   a wireless communication module coupled to the control unit and configured to send a message about the corresponding control command to a vehicle control system,
   wherein the automobile remote control key further comprises a button provided on a surface of the automobile remote control key, which is used as a human-machine interface for setting a mapping relationship between the motion pattern and the corresponding control command and storing the mapping relationship in a memory of the automobile remote control key.

2. The automobile remote control key according to claim 1, wherein the motion pattern is recognized by:
   determining a movement trajectory or a spatial attitude change of the automobile remote control key based on the movement data;
   determining a trajectory category to which the movement trajectory belongs or an attitude change category to which the spatial attitude change belongs; and
   determining a corresponding motion pattern based on the trajectory category or the attitude category.

3. The automobile remote control key according to claim 1, wherein the movement data comprises an acceleration or an angular velocity of the automobile remote control key at each moment.

4. An automobile remote control key, comprising:
   a wireless communication unit including an antenna array; and
   a control unit coupled to the wireless communication unit and configured to: recognize a motion pattern of a user based on a signal received by the antenna array from a signal source, map the motion pattern to a corresponding control command, and instruct the wireless communication unit to send a message about the corresponding control command to a vehicle control system,
   wherein the automobile remote control key further comprises a button provided on a surface of the automobile remote control key, which is used as a human-machine interface for setting a mapping relationship between the motion pattern and the corresponding control command and storing the mapping relationship in a memory of the automobile remote control key.

5. The automobile remote control key according to claim 4, wherein the signal source is a vehicle-mounted wireless communication module, and the control unit is configured to recognize the motion pattern by:
    determining relative positions between the automobile remote control key and the signal source at a plurality of moments based on the signal received by the antenna array, to obtain a movement trajectory of the automobile remote control key;
    determining a trajectory category to which the movement trajectory belongs; and
    determining a corresponding motion pattern based on the trajectory category.

6. The automobile remote control key according to claim 1, wherein the wireless communication unit is one type of the following: a Bluetooth communication module, an ultra-wideband communication module, and a low-frequency communication module.

7. A vehicle control system, comprising:
    a vehicle-mounted wireless communication unit configured to receive a message about a motion pattern from the wireless communication unit of the automobile remote control key according to claim 1; and
    a control unit coupled to the vehicle-mounted wireless communication unit and configured to instruct, based on the motion pattern, an execution component to execute a corresponding operation.

8. The vehicle control system according to claim 7, wherein the control unit comprises a memory, which is configured to store a mapping relationship between the motion pattern and a control command, and allow an operation of modifying the stored mapping relationship to be executed.

9. A vehicle control method using an automobile remote control key, comprising the following steps:
    obtaining movement data of the automobile remote control key by using a sensor provided in the automobile remote control key;
    recognizing a motion pattern of a user based on the movement data;
    mapping the motion pattern to a corresponding control command; and
    sending a message about the corresponding control command to a vehicle control system,
    the method further comprising setting a mapping relationship between the motion pattern and the corresponding control command and storing the mapping relationship in a memory of the automobile remote control key by operating a button provided on a surface of the automobile remote control key.

10. The method according to claim 9, further comprising the following step:
    generating the corresponding control command by the vehicle control system based on the motion pattern.

11. The method according to claim 9, wherein the step of recognizing the motion pattern comprises:
    determining a movement trajectory or a spatial attitude change of the automobile remote control key based on the movement data;
    determining a trajectory category to which the movement trajectory belongs or an attitude change category to which the spatial attitude change belongs; and
    determining a corresponding motion pattern based on the trajectory category or the attitude category.

12. The method according to claim 9, wherein the movement data comprises an acceleration or an angular velocity of the automobile remote control key at each moment.

13. A vehicle control method using an automobile remote control key, comprising the following steps:
    receiving a signal from a signal source by using an antenna array provided in the automobile remote control key;
    recognizing a motion pattern of a user based on the signal;
    mapping the motion pattern to a corresponding control command; and
    sending a message about the motion pattern to a vehicle control system via the antenna array,
    the method further comprising setting a mapping relationship between the motion pattern and the corresponding control command and storing the mapping relationship in a memory of the automobile remote control key by operating a button provided on a surface of the automobile remote control key.

14. The method according to claim 13, further comprising the following step:
    generating the corresponding control command by the vehicle control system based on the motion pattern.

15. The method according to claim 13, wherein the signal source is a vehicle-mounted wireless communication unit, and the step of recognizing the motion pattern comprises:
    determining relative positions between the automobile remote control key and the signal source at a plurality of moments based on the signal received by the antenna array, to obtain a movement trajectory of the automobile remote control key;
    determining a trajectory category to which the movement trajectory belongs; and
    determining a corresponding motion pattern based on the trajectory category.

* * * * *